April 13, 1965     M. J. VOGEL     3,178,580
MEANS FOR PRODUCING RADIATION INDUCED ELECTROLUMINESCENCE
Filed July 2, 1959

Inventor.
Marcel J. Vogel.
By Merriam, Lorch, & Smith.
Attys.

United States Patent Office 3,178,580
Patented Apr. 13, 1965

3,178,580
MEANS FOR PRODUCING RADIATION
INDUCED ELECTROLUMINESCENCE
Marcel J. Vogel, San Jose, Calif., assignor to International Business Machines Corporation, New York, N.Y., a corporation of New York
Filed July 2, 1959, Ser. No. 824,667
9 Claims. (Cl. 250—213)

This invention relates to methods of inducing electroluminescence by radiation, to the products produced by such radiation and to systems involving such products.

Electroluminescence under the action of alternating current has heretofore been known, but the level of light which may be produced by such action is extremely low, both in quantity and in relationship to the inducing current. It has been recognized in the art that D.C. electroluminescence, if it exists, has heretofore been so insignificant as to be of no importance or value.

The present invention involves a method of producing from known phosphors D.C. electroluminescence of a level quite beyond that heretofore obtainable from A.C. luminescence and includes the phosphors produced by such method.

Figure 1:
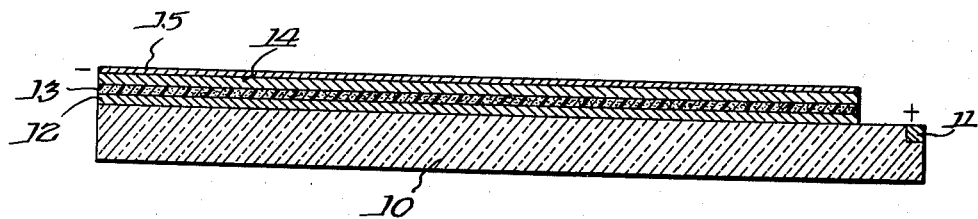
Figure 2:
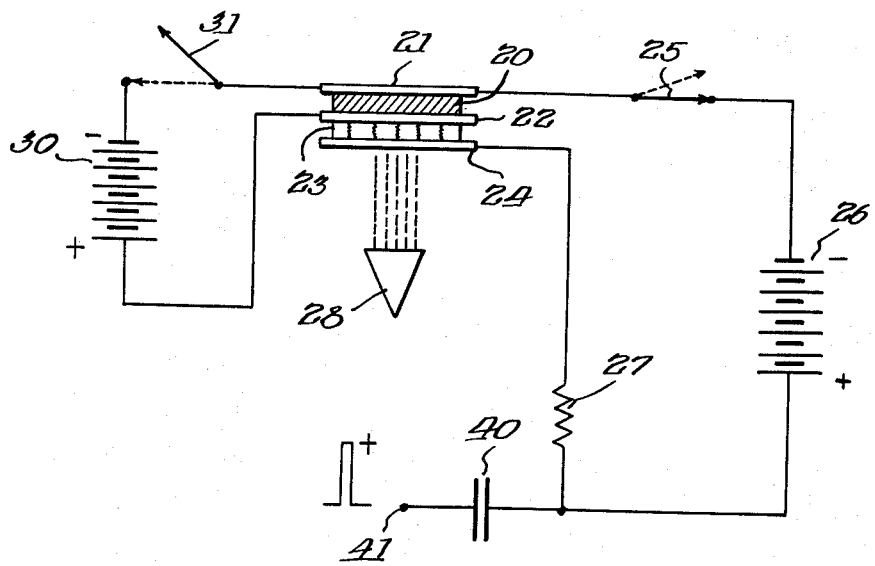

FIGURE 1 illustrates somewhat diagrammatically an electroluminescent combination of this invention. One group of the applications of the invention is illustrated in FIGURE 2 of the drawings.

The invention in its simplest form may be carried out by providing:

(a) A triboluminescent phosphor in the form of discrete tiny particles;

(b) Embedding these particles discretely in a transparent or translucent body, preferably thermoplastic;

(c) Applying this in a thin layer upon a dielectric, such as glass; and (d) Providing a flow of halogen ions, preferably chlorine, in a controlled path through the phosphor. This may be done most simply as follows:

(1) Applying an electrolyte or its equivalent to the surface to be activated. The electrolyte is preferably non-volatile and preferably viscous;

(2) Applying radiation of a form preferentially absorbed by the phosphor to the area to be activated;

(3) Passing a direct current into the electrolyte and away from the phosphor, i.e., the electrons passing first into the electrolyte and then into the phosphor; and (4) Continuing the radiation and the current until the desired activation has been secured.

After activation the area will produce continuous electroluminescence under a direct current and does not require the presence of the electrolyte nor the radiation for this purpose. The active area is also strongly photoluminescent.

An interesting fact is that the activation can be reversed or eliminated by the application of infra-red radiation while the current is applied.

The activated area retains its electroluminescence indefinitely, barring a breakdown through physical, chemical or thermal means.

A preferred example of the phosphor is zinc sulfide coactivated with manganese and chlorine (ZnS(Mn+Cl)). In the preparation of this 50 grams of zinc sulfide (RCA–36–Z–19), 1 gram of potassium chloride and 0.18 gram of manganese chloride ($MnCl_2$—$4H_2O$) were used. In making this combination the manganese chloride was blended with potassium chloride, and this blend was then in turn thoroughly mixed with the zinc sulfide phosphor. The resulting mixture was packed into a Vycor crucible, cover attached, and fired for 45 minutes at 1,000° C. and then cooled rapidly in the air. At this point the phosphor exhibited a pinkish-white fluorescence under long wave ultra-violet.

A glass panel was then prepared in the same manner as used in preparing standard electroluminescent A.C. phosphors. Such a panel is illustrated in FIGURE 1 of the drawings. As there shown a glass panel 10 was provided with a connection 11 for a positive electrode. A thin transparent or translucent coating of stannic oxide 12 was applied on one surface of the glass and in contact with the connection 11 to serve as a conductive plate. A layer of the preferred phosphor in plastic 13, which was a mixture of epoxy-urea-formaldehyde resin and silicon resin was applied on the stannic oxide coating 12. A viscous electrolyte 14, which comprised a 5% polyvinyl alcohol aqueous solution with 10% by weight of Arquad resin (quaternary ammonium chloride), was then applied on the phosphor coating and current supplied thereto by a contact 15. The electrolyte must be negative and the plate positive.

When the above prepared glass panel with the phosphor coated with electrolyte was activated at 250 volts D.C. by exposure, for a time sufficient to cause bright luminescence, to a long wave ultra-violet light from a 100-watt mercury lamp (GE H–100–SP4 lamp filtered through a Corning 5874 filter) spaced 7 inches from the panel, the phosphor coated with electrolyte exhibited a continuous bright yellow D.C. electroluminescence after the ultra-violet light was removed.

In the preferred phosphors a manganese concentration from 1 part to 5 parts per 1,000 zinc sulfide (ZnS) is employed.

The preferred flux is potassium chloride at a percentage of 2 parts per hunder of zinc sulfide. By using a firing temperature of 1,000° C., mixed crystals of cubic and hexagonal form were produced which gave a pink fluorescence under long wave ultra-violet after baking for 45 minutes at 1,000° C. A film prepared from this and activated gave a bright orange-yellow D.C. electroluminescence.

Firing at 1,200° C. produced essentially a hexagonal system of crystals.

It has been found that the film of phosphor-impregnated plastic should not greatly exceed 2½ mils in thickness. This apparently is due to the fact that with greater thicknesses either the electrical continuity of the system is lost or that shorting occurs under the increased potential required for passage of the current. While the particles are too small to make direct observation of much value, it would appear to be essential that there be some contact of the particles with each other to form a chain of conductivity through the plastic but that if this contact is too great the effect is lost also. The particles employed should be quite small, normally being below 50 microns. With particles of this size the preferred ratio of phosphor to plastic is about 3 to 1 by volume, and with this ratio a film thickness of 1½ to 2½ mils has been most satisfactory.

In preparing the coating it is preferred to spray the mixture of plastic and phosphor on the conductive surface using an air spray and building up the coating slowly. A typical composition is prepared in the following manner:

50 cc. of a solution of resin 220–8, butylated urea formaldehyde resin (American Cyanamid Co.), 50% solids in a solvent consisting of 30 parts by volume of butyl alcohol and 20% by volume of xylol. To this is added 200 cc. of a resinous solution made up at the rate of 20 grams of Dow Epoxy #2667 for each 80 cc. of toluene and 20 cc. of normal butyl alcohol.

To this is added 20 cc. of SR–82, a General Electric silicone resin, added as a flow control agent. This contains 60% resin with xylol as a solvent.

This is mixed with 1/3 by volume of equal parts by volume isophorone, ethyl amyl ketone and xylol.

To this mixture of solvents the phosphor is added at the rate of 9.8 grams per 20 cc. and 0.3 gram methyl nadic anhydride for the same volume. When dried, the volume ratio of phosphor to the resin is 3 to 1 in the final film.

The methyl adic anhydride is found to be particularly good for giving adhesion to glass surfaces in the epoxy system. Where it is desired to have a strippable coating, methyl succinic anhydride in the same ratio gives poor adhesion and permits stripping.

It is preferred to blend the phosphor with the vehicle with a minimum amount of stirring. Spraying may be done by a Pasche spray gun, model V, spraying 1.25 cc. of material onto each 1 inch by 3 inch glass slide. Distribution of the coating may be observed by ultra-violet to insure uniformity. After application each sample is baked until set. Ten minutes to an hour at 170° C. is normally sufficient.

A preferred manner of application of the film to the conductively coated glass is to apply a clear plastic base made up of the silicone resin and the epoxy resin which is less than 1 mil in thickness and which is baked for 2 minutes at 170° C. so that it is only partially set. A second clear coat is then sprayed on it of about the same thickness, and while this film is still in the tacky stage the phosphor sprayed onto it with an air brush. This embeds the particles into the tacky surface uniformly but still leaves them exposed to contact with the electrolyte. The surface may then be sprayed with a 5% solution of tetrabutyl titanate in normal butyl alcohol. This results in cross-linking the surface of the epoxy resin, fixing the phosphor particle in space and preventing the sinking-in and flooding of the phosphor particle during the process of heating, curing, or baking. This results after cure in a thin layer of phosphor on the surface of the plastic and a total film thickness within the 2 mil limits specified above.

The electrolyte employed in the activation should be viscous so that it will not run off of the surface to be activated. Polyvinyl alcohol solution (i.e., 5% in water) is satisfactory. It is preferred, however, to add about 10% by weight of an Arquad resin (a quaternary ammonium salt).

The negative terminal of a D.C. source is connected to the electrolyte solution and ultra-violet light is applied to the surface to be activated. The wave length employed depends upon the absorption characteristics of the phosphor. Long wave ultra-violet in the neighborhood of 3600 A. is suitable with many of the phosphors. A suitable lamp source is GE H–100–SP 4 lamp filtered through a Corning 5874 filter. The quantity and quality of induced electroluminescence depends upon the time to which a sample is exposed to the ultra-violet while under the influence of the current. It also depends upon the voltage applied. Voltages of the order of 100 to 500 are preferable.

During the activation it is believed that an oxidating effect is produced by the migration of chlorine or halogen ions (or gas) through the electrolyte and on the surface of at least some of the phosphor particles resulting in a penetration of said gas or ions into the crystal lattice of the phosphor.

Lower voltages than 150 do not appear to activate normally within a convenient time, whereas voltages that are too high may break down the system.

One of the peculiar results of the activation is that when one now applies a D.C. field and excites to luminescence, pulsing the area with long wave (3600 A.) ultra violet will cause a variation in current flow.

If the panel is sprayed with a clear base which is then cured by baking one-half hour at 170° C., the application of the phosphor layer on this surface frequently produces no effect. This is apparently because the particles do not contact the conductive surface below, whereas when the unset coating is used the particles apparently do adjust themselves in space to complete a conductive link. In other words, the phosphors must be arranged as a link through the film, but if the film is too thin a short occurs and activation does not ensue.

It has been found that the character of the electrolyte is important. It is preferred to employ an electrolyte which includes a halogen, and particularly chlorine. Not much chlorine is used since unless remarkable efforts of purification are taken there would be enough chlorine in almost any substance or in almost any sample of water to produce the necessary results. However, it is preferred to use potassium chloride, hydrochloric acid, sodium hypochlorite, sodium chloride or a quaternary ammonium chloride salt. Hydrofluoric acid produces a much weaker effect than hydrochloric.

Apparently the electrolyte, together with the ultraviolet, produces a photoconductivity in the phosphor particles sufficient to allow a weak current to pass through the film. In the direction in which the current flows the phosphor grains are positive, and chlorine can be transported to these grains and there deposited with a resultant chemical effect on the crystal.

If we accept the generally accepted theories as to crystal lattice structure of semi-conductors, it would appear that shallow donor levels of chlorine have been induced in the exposed phosphor grain crystals. This is consistent with an increase in photoconductive response which has been noted. Furthermore, this D.C. photoconductivity increases as the induced electroluminescence increases and, of course, as photoconductivity increases, the amount of current grows and permits a deeper penetration of the chlorine into the lower phosphor layers.

Other phosphors which may be used in place of the specific example just given are:

(a) ZnS(Mn)    (d) ZnCdS(Cu+Mn)
(b) ZnCdS(Mn)    (e) ZnS(Pb+Mn)
(c) ZnS(Cu+Mn)    (f) ZnCdS(Pb+Mn)

It has also been found that the phosphors may be made D.C. luminescent in other manners. Using the same phosphor and the same electrolyte in the same arrangement, it has been found that on the application of an A.C. field through the electrolyte using 50 to 400 volts R.M.S. at from 20 to 4000 cycles while the surface under treatment is scratched slightly as with a needle, the scratched areas develop electroluminescent areas. There is no need in such cases for external radiation. It would appear that the same changes have been produced in the crystal lattice structure.

It has also been found that D.C. electroluminescence may be produced with these phosphors without the use of an electrolyte. This may be done by applying the phosphor to the plastic film while the latter is in only a partially cured state, the application of the phosphor being at high velocity as in a sand-blasting apparatus. Thereafter, a metal electrode, for example a silver paste, is applied to the sand-blasted side and a direct current applied to the conductive coating on the glass plate positive and the silver paste electrode negative. In this case, however, the D.C. electroluminescence, while steady, fades after ten or fifteen minutes.

It is believed that the phosphor crystals are cracked or fractured or otherwise stressed, creating changes in the crystal lattice which induces the property of D.C. electroluminescence.

As shown in FIGURE 2, the electroluminescent phosphor combination of the present invention may readily be incorporated into an electrical system in which it functions as an operative means.

As described in FIGURE 2, the electroluminescent phosphor combination of FIGURE 1, here designated as 20, is placed between a conductive plate 21 and a transparent conductive layer 22. On the other side of the layer 22 is a layer of photoconductor 23 which may, for example, be cadmium sulfide. On the other side of the photoconductor is another transparent conductor 24.

A circuit is provided connecting the conductive plate 21 and the conductive plate 24. This circuit includes the switch 25, battery 26 and the load resistor 27. A light source 28 is arranged so that it will deliver electromagnetic radiation (such as light) through the conductive layer 24 to the photoconductor 23.

The potential of the battery 26 and the arrangement of the electrical system of which it is a part are so selected that normally there is not sufficient potential across the electroluminescent phosphor 20 to cause it to produce radiation, or at least not sufficient radiation as to energize the photoconductor 23.

However, when a flash of light is produced by the light source 28, the impedance of the photoconductor 23 is sufficiently reduced so that the increased voltage then applied across the electroluminescent phosphor 20 causes the latter to give off sufficient radiation (light) to maintain the impedance of the photoconductor 23 at a low value. The system, therefore, once actuated, maintains itself so long as the potential of the battery is maintained. In this system, as so described, the electroluminescent phosphor combination acts to produce a latch circuit.

In this system the electroluminescent phosphor combination is also a trigger which establishes the circuit on which it then becomes a latch.

The phosphor can be extinguished by opening switch 25 which thereupon returns the impedance of the photoconductor to its original level. Closing of the switch, therefore, will not reactivate phosphor until an impulse is received from the light source 28.

Another method of actuating the system is indicated by the circuit in the left-hand side of the drawing which comprises a battery 30 and a switch 31, together with connections to the plates, one of which leads to the conductive plate 21 and the other of which leads to the conductive plate 22. Closing of the switch 31 applies sufficient external voltage across the phosphor 20 to cause it to give off sufficient radiation to reduce the impedance of the photoconductor 23 and thereby apply sufficient voltage on the first circuit to maintain the electroluminescence of the phosphor combination 20. The switch 31 need only be momentarily closed. This system, like the first, may be returned to the dark condition by opening the switch 25.

A third method of energizing the system is indicated by the capacitor 40 and a terminal 41 to which a positive pulse may be applied. The application of a positive pulse here may be employed to increase the over-all potential across both the phosphor 20 and the photoconductor 23 so as to trigger the action of the system and establish the latch circuit.

ZnCdS-Cu-Mn, heretofore described as one of the most satisfactory triboluminescent phosphors, is sold under the name L-302-A-1 by U.S. Radium Corp. X-ray analysis indicated a representation of 63.5% ZnS, 36% CdS and ½% $Mn(NO_3)_2 \cdot 6H_2O$. Copper was indicated by Emission Spectrograph to be less than 0.1%, and there was a trace of silicon. The product had an average particle size of 31.0 microns and a porosity of .500. Crystal study indicated that the zinc sulfide was mostly of the alpha form with some of the beta form. Crystals were either mixed crystals or crystalline solid solution between zinc sulfide and cadmium sulfide.

Another phosphor sold under the name USRC 3630 by U.S. Radium Corporation on X-ray analysis indicated 98.80% zinc sulfide and 1.1% manganese nitrate. This product, on Emission Spectrographic analysis, showed less than .1% copper and a trace of silicon. On wet chemical analysis .1% zinc oxide was found. The average particle size was 11.50 microns and the porosity .500. The crystal structure indicated a small amount of beta zinc sulfide, cubic, and a large amount of alpha zinc sulfide, hexagonal.

Phosphors prepared in the manner herein described, excited at 250 volts D.C., have shown 15.8 microwatts per $cm.^2$ or approximately 9 foot lamberts.

The only previous D.C. luminescent materials known to applicant comprised suspensions of materials like zinc sulfide in liquid between two conductive plates. Luminescence obtainable from such systems is insufficient even to actuate available light meters, even when using an instrument sensitive to .005 microwatt per $cm.^2$.

I claim:
1. A method of preparing an electroluminescent phosphor layer capable of luminescing under direct current comprising the steps of:
   contacting one side of a triboluminescent phosphor layer with an electrolyte containing halogen ions;
   applying a D.C. field across said phosphor layer with the electrolyte side of the phosphor layer having a lower potential than the opposite side thereof; and
   simultaneously, with the application of said D.C. field, exposing said phosphor layer to radiation of wave lengths effective to produce photoconductivity in the phosphor sufficient to allow current to pass through the phosphor layer.

2. The phosphor layer prepared by the method of claim 1.

3. A method of preparing an electroluminescent phosphor layer capable of luminescing under direct current comprising the steps of:
   contacting one side of a phosphor layer, comprising a manganese activated phosphor, with an electrolyte containing halogen ions;
   applying a D.C. field across said phosphor layer with the electrolyte side of the phosphor layer having a lower potential than the opposite side thereof; and
   simultaneously, with the application of said D.C. field, exposing said phosphor layer to radiation of wave lengths effective to produce photoconductivity in the phosphor sufficient to allow current to pass through the phosphor layer.

4. A method of preparing an electroluminescent phosphor layer capable of lucinescing under direct current comprising the steps of:
   contacting one side of a triboluminescent phosphor layer with an electrolyte containing halogen ions;
   applying a D.C. field across said phosphor layer with the electrolyte side of the phosphor layer having a lower potential than the opposite side thereof; and
   simultaneously, with the application of said D.C. field, exposing said phosphor layer to ultraviolet light radiation.

5. A method of preparing an electroluminescent phosphor layer coated with an electrolyte capable of luminescing under direct current comprising the steps of:
   coating one side of a triboluminescent phosphor layer with an electrolyte containing halogen ions;
   applying a D.C. field across said phosphor layer with the electrolyte side of the phosphor layer having a lower potential than the opposite side thereof; and
   simultaneously, with the application of said D.C. field, exposing said phosphor layer to ultraviolet light radiation.

6. A method of preparing an electroluminescent phosphor layer capable of luminescing under direct current comprising the steps of:
   contacting one side of a phosphor layer, comprising zinc sulfide activated with manganese, with an electrolyte containing chlorine ions;
   applying a D.C. field across said phosphor layer with the electrolyte side of the phosphor layer being negative relative to the opposite side thereof; and
   simultaneously, with the application of said D.C. field, exposing the electrolyte side of said phosphor layer to long wave ultraviolet radiation.

7. A method of fabricating an electroluminescent device capable of luminescing under direct current comprising the steps of:

Providing first and second electrodes on opposite sides of a phosphor layer comprising a dielectric binder having dispersed therein triboluminescent phosphor particles, said phosphor particles making partial contact with each other and said second electrode;

contacting said first electrode and the phosphor particles adjacent the first electrode with an electrolyte containing halogen ions;

applying a D.C. field between said first and second electrodes with said first electrode having a lower potential than said second electrode; and simultaneously, with the application of said D.C. field, exposing said phosphor particles to radiation of wave lengths effective to produce photoconductivity in the phosphor particles sufficient to allow current to pass between said first and second electrodes.

8. A method of fabricating an electroluminescent device capable of luminescing under direct current comprising the steps of:

providing first and second electrodes on opposite sides of a phosphor layer including a dielectric binder having dispersed therein particles of a phosphor comprising zinc sulfide activated with manganese, said phosphor particles making partial contact with each other and said second electrode;

coating said first electrode and the phosphor particles adjacent the first electrode with a viscous electrolyte containing chlorine ions;

applying a D.C. field of about 150 to about 500 volts between said first and second electrodes and across said phosphor layer with said first electrode being negative in respect to said second electrode; and simultaneously, with the application of said D.C. field, exposing said phosphor layer to long wave ultraviolet radiation.

9. A latch circuit comprising:

a D.C. electroluminescent phosphor layer;

a photoconductive layer disposed in electrical contact with said phosphor layer;

means for supplying a D.C. voltage, across said phosphor layer and said photoconductive layer, ineffective for causing radiation from the phosphor layer sufficient to reduce the impedance of the photoconductive layer to close said circuit; and actuating means operable for a period of time for reducing the impedance of said photoconductive layer so that the radiation from said phosphor layer is sufficient to maintain the impedance of the photoconductive layer reduced after said period of time, thereby closing said circuit and placing the circuit in a latched condition.

References Cited by the Examiner

UNITED STATES PATENTS

| | | | |
|---|---|---|---|
| 2,721,950 | 10/55 | Piper | 313—108 |
| 2,728,870 | 12/55 | Gungle | 313—108 |
| 2,773,216 | 12/56 | Edmonds | 313—108 |

GEORGE N. WESTBY, *Primary Examiner.*

RALPH G. NILSON, *Examiner.*